United States Patent
Tweedly et al.

(10) Patent No.: US 7,136,377 B1
(45) Date of Patent: Nov. 14, 2006

(54) TUNNELED DATAGRAM SWITCHING

(75) Inventors: Alex Tweedly, Argyll (GB); Bruce Thompson, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/539,408

(22) Filed: Mar. 31, 2000

(51) Int. Cl.
*H04L 12/66* (2006.01)
*H04L 12/28* (2006.01)
*H04J 3/24* (2006.01)

(52) U.S. Cl. .................. 370/356; 370/389; 370/392; 370/473; 370/474

(58) Field of Classification Search ............... 370/389, 370/392, 521, 395, 409, 465–466, 473, 474, 370/401, 477, 352–356, 400, 395.1; 709/236, 709/247, 238, 242, 249, 342
See application file for complete search history.

(56) References Cited

U.S. PATENT DOCUMENTS

| | | | | |
|---|---|---|---|---|
| 6,041,054 A | * | 3/2000 | Westberg | 370/389 |
| 6,366,961 B1 | * | 4/2002 | Subbiah et al. | 709/238 |
| 6,542,504 B1 | * | 4/2003 | Mahler et al. | 370/392 |
| 6,680,955 B1 | * | 1/2004 | Le | 370/477 |
| 6,711,164 B1 | * | 3/2004 | Le et al. | 370/392 |
| 6,751,209 B1 | * | 6/2004 | Hamiti et al. | 370/349 |
| 6,754,231 B1 | * | 6/2004 | Jonsson et al. | 370/474 |

OTHER PUBLICATIONS

The ATM Forum, "ATM Trunking using AAL2 for Narrowband Services," Feb. 1999, pp. i-vi and 1-52.
S. Casner and V. Jacobson, "Compressing IP/UDP/RTP Headers for Low-Speed Serial Links," Feb. 1999, pp. 1-22.

* cited by examiner

*Primary Examiner*—Chi Pham
*Assistant Examiner*—Melanie Jagannathan
(74) *Attorney, Agent, or Firm*—Marger Johnson & McCollom, P.C.

(57) ABSTRACT

A method for transporting real-time data such as voice over a packet-based infrastructure, and a switch for use with that method, are disclosed. In this method, datagrams from multiple data streams are packaged in a single tunnel packet for transport across a network to an intermediate switching point (switch). To reduce bandwidth, each datagram in the tunnel packet (e.g., tunneled datagram) can be sent in a compressed-header format identified by a context identifier (CID) for its data stream. The switch saves context state for each tunnel and CID it is receiving packets for. The switch deaggregates received tunnel packets into tunneled datagrams and associates each datagram with its context state. Based on the destination indicated in its context state, each datagram it re-aggregated in an outgoing tunnel packet bound for a next switch or the destination endpoint itself.

24 Claims, 10 Drawing Sheets

TUNNELED DATAGRAM SWITCHING

FIELD OF THE INVENTION

This invention pertains generally to packet switching of voice and similar isochronous data, and more particularly to methods and apparatus for switching tunneled datagrams within a wide-area network (WAN).

BACKGROUND OF THE INVENTION

"Voice data" generally refers to data that has been created by sensing and digitizing human-audible sounds, and is a primary source of data for telephone networks. Traditionally, voice data has been transmitted over the Public Switched Telephone Network (PSTN) using 8,000 digital audio samples per second, eight bits/sample. This means that one-way voice communication on the PSTN requires 64 kbits/second of network bandwidth. In the traditional scheme, TDM (Time Division Multiplexing) has been used to carry more than one voice channel on a network link, e.g., by dividing a higher bit-rate channel into frames comprising multiple "time slots", and assigning each voice channel to a certain time slot in each frame.

Circuit-switched TDM as described above uses more network bandwidth than absolutely necessary to transmit voice signals. First, because on a typical TDM link a circuit is dedicated to each call, each voice channel uses all of its allotted time slots, even if the voice data is blank because the speaker is silent. Second, many voice compression algorithms exist that can significantly reduce the number of bits required to transmit a voice signal with acceptable quality, but circuit-switched TDM is not designed to use these algorithms.

Packet voice technology is considered to be the successor to today's TDM voice networks. A packet generally consists of a header, which contains information identifying the packet, and a payload, which in this case carries voice data. An advantage of packet voice is that no dedicated end-to-end path through the carrier network is required. This is because each packet is a self-contained datagram, with the header containing all the information necessary to route the packet through the network to its destination.

With packet voice, the payload of each packet represents a number of consecutive voice samples from the same call (e.g., a 10 msec voice packet is equivalent to 80 TDM samples). Using a codec (compressor/decompressor), the voice data samples can be compressed on a per-packet basis. For instance, using a G.729 codec, 10 msec of voice can be reduced from 640 bits to 80 bits of information prior to transmission of the packet. And during silent periods, packets need not be sent at all. Accordingly, voice data payloads can require much less bandwidth/call in a packet-switched system than in a circuit-switched system.

The sampling interval used in packet voice to assemble a complete packet also comes with a disadvantage. Because no samples from a given sampling interval can be dispatched until the end of the sampling interval, a packet formation delay is introduced in the voice data. Thus the sampling interval cannot be too long (generally, anything more than a few tens of msec is considered too long), or call quality suffers.

To avoid call quality degradation, packets are generally sent at small intervals, e.g., every 10 msec. For a G.729 codec and a 10 msec sampling interval, this translates into a 10-byte packet payload. But as the datagram's header(s) may require 40 bytes or more, a great deal of the bandwidth efficiency gained over TDM is lost because of the relatively large header required per packet and the number of small-payload packets that must be sent. Although methods have been proposed to compress higher-layer headers across a single network link, these methods can place a heavy computational tax on each network element that must deal with the compressed headers, and the efficacy of such methods is highly dependent on the link layer technology employed. Particularly for core network switches, the sheer number of packets handled on each link make such approaches undesirable.

As a second alternative to TDM, PSTN providers have begun to deploy a networking technology known as Asynchronous Transfer Mode, or ATM. ATM promises an ability to mix voice, video, and other data on a connection-oriented network, and an ability to take advantage of voice activity detection (VAD) and compression algorithms to decrease bandwidth requirements for circuit-switched calls.

ATM mixes some concepts borrowed from circuit switching with some concepts borrowed from packet switching. An ATM network is tag-switched, and supports only one fixed, relatively short packet size—a 53-byte packet called a cell. Without regard to the type of information contained in a cell, each ATM cell must have a five-byte cell header and a 48-byte payload. The cell header is not a true datagram header, however, as it does not contain enough information to allow end-to-end delivery of a cell.

The cell header contains two identifiers—a Virtual Path Identifier (VPI) and a Virtual Channel Identifer (VCI). VPIs and VCIs are explicitly assigned at each segment of a connection and, as such, have only local significance across a particular link. They are remapped, as appropriate, at each switching point. When used as intended, groups of VCIs following a common route use the same VPI, so that intermediate ATM switches need only switch the group based on VPI and not on VCI.

Although ATM cells have packet characteristics, ATM is connection oriented. That is, two systems must set up an end-to-end "connection" over the network before they can communicate packets. This connection set-up uses a switch control protocol to establish a Virtual Circuit (VC) on each link in the end-to-end path. Although similar in some ways to a TDM-switched circuit, the VC does not require a dedicated circuit like a TDM connection; instead, the connection is merely a grant of permission to transmit cells at a negotiated data rate, with some guarantees as to quality-of-service (QoS) parameters such as minimum cell rate, average cell rate, and network delay.

When used with a voice codec such as G.729, ATM, like packet-based voice, may also waste bandwidth—not because ATM cell headers are excessively long, but because the cell payload is fixed at 48 bytes. For instance, G.729 requires only 8 kbits/sec of payload (only 10 bytes are required for each G.729 10 msec payload). But when each G.729 10 msec payload is placed into its own ATM cell, the resulting bandwidth is 42 kbits/sec.

To circumvent this problem, an AAL2 trunking service has been devised to pack multiple compressed voice payloads into one ATM cell. In the ATM protocol scheme, an ATM Adaptation Layer (AAL) interfaces higher-level protocols to the ATM layer (which buffers and forwards cells and provides connection and traffic management). AAL2 provides a service that can be used to multiplex compressed voice data from up to 248 separate calls onto one bearer VC. Data from multiple calls is packed into the payload of each cell, by attaching one of 248 available session Context Identifiers (CID) to each sub-payload. At the receiving end of an AAL2 trunk, the CIDs are used to de-multiplex the sub-payloads and associate them with an outgoing connection. When operating at full efficiency, AAL2 can provide a G.729 effective bandwidth of about 12 kbits/sec per call.

Figure 1:
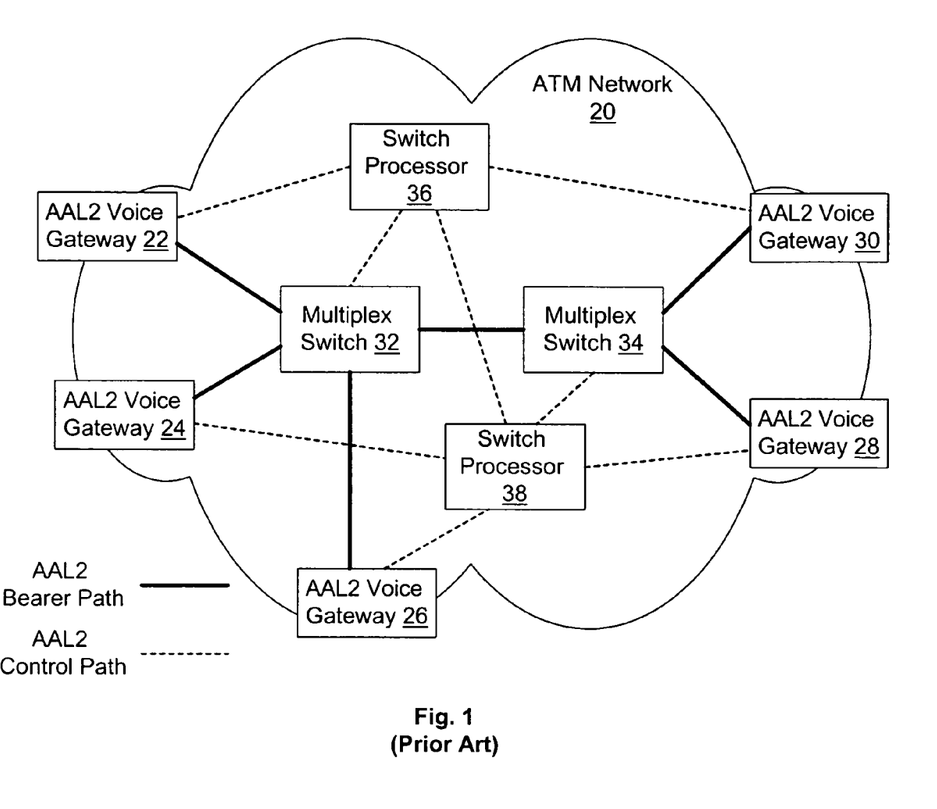
FIG. 1 contains a block diagram illustrating a prior art AAL2 network layout.

FIG. 1 shows an exemplary ATM/AAL2 network (the underlying ATM network 20 will typically handle other types of ATM traffic as well as AAL2). At the edge of network 20, AAL2 voice gateways 22, 24, 26, 28, and 30 route calls from PSTN TDM networks, Private Branch Exchanges (PBXs), and packet data networks (not shown) through the ATM network. For a particular call traversing ATM network 20, call signaling information is interpreted by switch processors 36 and 38, and an AAL2 bearer path through ATM network 20 is devised for the bearer channel data (call signaling for the call is also transported in some manner across the network to the call's egress point). Switch processors 36 and 38 complete the AAL2 bearer path by deciding which AAL2 VC to use on each AAL2 hop in the call's path, and by assigning a CID to the call for each VC that transports it. Switch processors 36 and 38 supply the ingress and egress voice gateways with mapping from their front end ports handling the call to the appropriate AAL2 VC and CID. Switch processors 36 and 38 supply multiplexing switches 32 and 34 with an inbound VC/CID and an outbound VC/CID for the call.

Bearer data for each call is handled as follows. Each call's bearer channel data is translated by its ingress gateway to AAL2 format—the translation includes compression, addition of an AAL2 CID, and multiplexing onto an outbound AAL2 VC as instructed by the switch processor. If the call goes through an AAL2 multiplexing switch, that switch demultiplexes the inbound AAL2 trunk into sub-payloads, examines the inbound CIDs of the sub-payloads, maps the sub-payloads to outbound VCs and CIDs, and multiplexes the sub-payloads sharing a common outbound VC. At the egress gateway, that call's bearer channel data is demultiplexed off of an inbound AAL2 VC, decompressed, and forwarded out of ATM network 20 towards its final destination.

Despite the efficient transport capabilities of the ATM/AAL2 voice network, it does have its disadvantages. First, the switch processors 36 and 38 must provide routing and call control (e.g., CID mapping) to the core AAL2 multiplex switches 32 and 34; thus, as the number of AAL2 trunks grows, the demands on the switch processor network increases, since the switch processor must control each ATM hop. The switch processors must comprehend, control, and balance usage of the AAL2 trunks and AAL2 multiplex switches to ensure efficient utilization of network resources. And the switch processors must provide a failover capability that recognizes when an AAL2 trunk or endpoint goes down and re-routes calls around the failure. As the network scales, these tasks become more and more difficult for the switch processors to perform well.

SUMMARY OF THE INVENTION

The preferred embodiments of the invention were designed to retain what is good about AAL-2 trunking (low average bit-rate per voice channel), while adding robustness and scalability at a level not found in the AAL-2 approach. Whereas AAL-2 uses a multiplex that switches on two tags (VPI/VCI, for each AAL-2 trunk, and CID, for each call in a VPI/VCI trunk) at each switching point as instructed by a switch processor, the preferred embodiments use a multiplex that can be switched under local switch control on two datagram headers, one that identifies the trunk, and a second that identifies the destination of each call in the trunk. Preferably, the second header is compressed, and the first header may be compressed on a link basis as well. Although this change in multiplex format may not seem significant in the abstract, it allows a host of significant differences in how a network according to the invention can operate.

First, call control can be greatly simplified. In preferred embodiments, call agents control call admission only: the call agent does not control core network routing, is not needed to instruct switching points, and is not needed to provide failover capability. These improvements enhance the scalability of the network.

Second, the preferred embodiments utilize dynamic end-to-end network routing. This allows any switching point in the network to reroute around a failure, without instruction. And because these embodiments can operate in an Internet Protocol (IP) environment, they can leverage the extensive IP routing capabilities already in place. Furthermore, between IP switching points, multiplexed packets produced by these embodiments can be transported efficiently on any underlying network, including ATM.

Third, the preferred embodiments overcome bandwidth limitations found in other datagram (more specifically, IP) voice networking approaches. Because multiple call payloads can be combined in one IP packet, the cost of the IP and link-level headers is amortized over several call payloads. And because the payload headers are compressed at an application layer instead of at link layer, the header compression processing burden lies mainly at the ingress and egress points and multiplex switches, instead of at each network link, and can be distributed to the gateway processors that run the voice codecs for each voice data stream.

Several terms in this disclosure have defined meanings. A datagram is a packet containing all information necessary for its delivery. This condition may, however, be satisfied where two datagrams belong to the same stream, the first contains all information necessary for its delivery, and the other makes reference to the first. A tunnel packet encapsulates one or more tunneled datagrams in a network-deliverable format that does not require reference to the datagrams themselves (the datagrams become merely a tunnel packet payload) during transport across a network tunnel.

BRIEF DESCRIPTION OF THE DRAWING

The invention may be best understood by reading the disclosure with reference to the drawing, wherein.

DETAILED DESCRIPTION OF THE PREFERRED EMBODIMENTS

Figure 2:
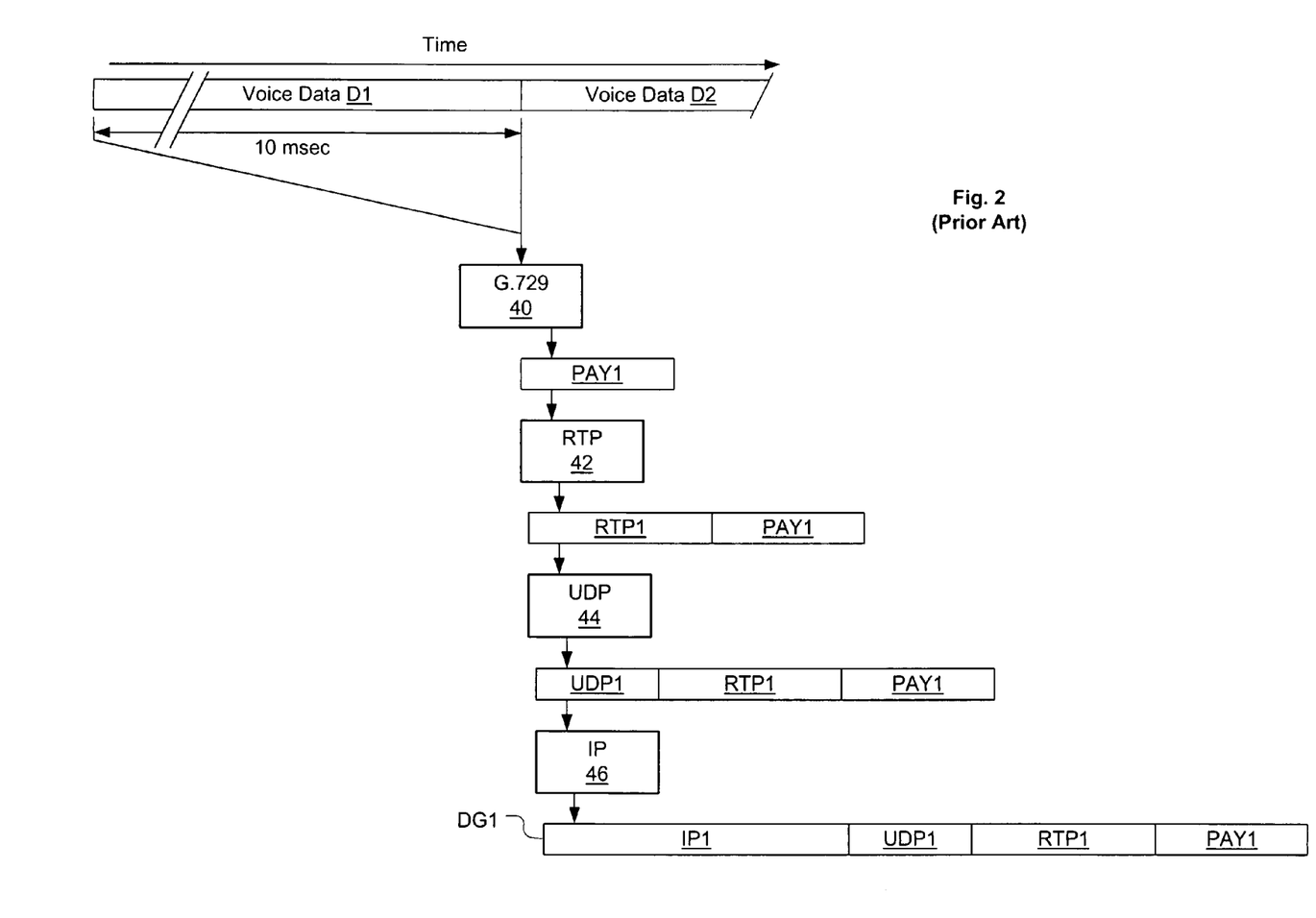
FIG. 2 shows a prior art process for creating a compressed voice real-time datagram.

The preferred embodiments are described below in the context of one of many known methods for creating packet voice data payloads, as depicted in FIG. 2. This method entails using Voice Activity Detection (VAD) to suppress packet generation during quiet times (a silence packet may be sent to indicate that the voice decoder should insert comfort noise in its output during these intervals). When voice activity is present, digitized audio is compressed for fixed time slices (e.g., 10 msec) using a coder such as the G.729 coder. FIG. 2 shows G.729 coder 40 gathering 10 msec of digitized voice data D1, and compressing D1 to create a compressed voice payload PAY1. Assuming voice activity is present during the next 10 msec, at the end of that period voice data D2 will be compressed likewise.

Compressed packet voice payloads are next encapsulated using the Real-time Transport Protocol (RTP), as described in H. Schulzrinne et al., "RTP: A Transport Protocol for Real-Time Applications", Network Working Group, RFC1889, January 1996. The protocol itself does not provide any mechanism to ensure timely delivery, to guarantee delivery (e.g., no retransmission scheme), or to prevent out-of-order delivery. The characteristics of this transport protocol do, however, include packet sequence numbering and data timestamping, useful features for ordering mis-ordered packets and identifying missing packets. Although various options may extend the length of an RTP header, the basic header is twelve octets long. FIG. 2 shows an RTP block 42 prepending an RTP header RTP1 to PAY1.

Conventionally, RTP packets are encapsulated using the User Datagram Protocol (UDP), as described in J. Postel, "User Datagram Protocol", USC/Information Sciences Institute, RFC768, August 1980. UDP provides basic packet delivery services to an IP destination port, including adding a length field and a checksum covering IP variables, the UDP header itself, and the UDP packet data. UDP does not guarantee delivery or provide flow control. A UDP header is eight octets long. FIG. 2 shows UDP block 44 prepending a UDP header UDP1 to RTP1 and PAY1.

An RTP/UDP packet is next encapsulated using Internet Protocol (IP) headers, thereby forming a fully-addressed datagram. The IP header is twenty octets long. FIG. 2 shows IP block 46 prepending an IP header IP1 to UDP1, RTP1, and PAY1 to form datagram DG1.

Once datagram DG1 is formed, it is ready for delivery to a link layer. Note that in this example, PAY1 occupies only 20% of DG1, with the rest occupied by the headers. Others have noted this high overhead, and how this degrades throughput on a low-speed serial link (such as a telephone modem). To alleviate part of this overhead, various methods for compressing one or more headers across a link have been proposed. Of particular interest is a method designed for packets like datagram DG1. This method is described in S. Casner and V. Jacobson, "Compressing IP/UDP/RTP Headers for Low-Speed Serial Links", Network Working Group, RFC2508, February 1999, and will be referred to herein as CRTP (Compressed RTP).

CRTP works because, for a given RTP stream, the header fields of packets in that stream are to a large extent either static or predictable from trends observed in previous packets for that stream. CRTP sends static fields only once, and initializes predictable fields and deltas by which the predictable fields should change from packet to packet. Unless some of these fields change in a manner that cannot be predicted, packet headers for subsequent packets are elided and replaced by a short CRTP header (as short as four octets) indicating length and a context ID.

Figure 3:
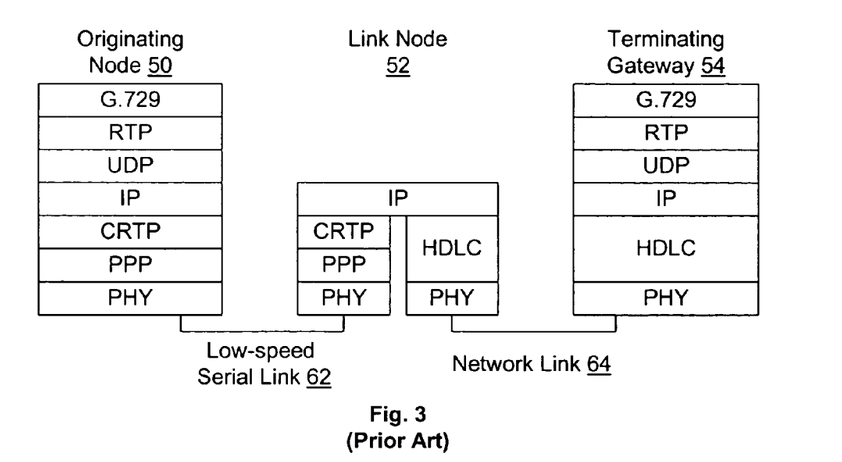
FIG. 3 illustrates protocol stacks for a communication path employing CRTP.

CRTP was designed to operate in an environment as depicted in FIG. 3. FIG. 3 illustrates protocol stacks that run on originating node 50, link node 52, and terminating gateway 54. Originating node 50 and link node 52 are connected by low-speed serial link 62.

Nodes 50 and 52 negotiate, at link layer, the use of CRTP for a selected RTP stream. A "session context" is established at link layer for the selected stream, and a context state for that session is maintained by both node 50 and node 52. Typically, initialization of the session context requires that at least one full RTP/UPD/IP header field be transmitted from node 50 to node 52, and identified with the context. A CRTP compressor is then used at node 50 to compress the following RTP/UDP/IP headers for this stream. A corresponding CRTP decompressor at node 52 restores the RTP/UDP/IP headers using the session context.

Link node 52 uses the restored IP headers to route the RTP packets across network link 64 (which may consist of many links, not shown) to a terminating gateway 54. Terminating gateway 54 is the UDP/RTP/G.729 peer for originating node 56.

Although CRTP can provide significant savings in header compression, it only solves the problem for one link, the low-speed serial link. To provide similar savings elsewhere in a network path, each link would have to maintain a CRTP compressor and decompressor. This places a high computational burden on core network switching and routing resources that switch hundreds of thousands of packets per second, and may require modifications to those resources that are either physically or logistically impossible to make. CRTP performance is also strongly dependent on the underlying link layer technology. For instance, when the link layer technology is HDLC (High-level Data Link Control), CRTP can achieve a link bandwidth of about 16 kbits/call. But when ATM AAL-5 is the link layer technology, 42 kbits/call is all that can be achieved because of the fixed cell size. For these and other reasons, CRTP does not provide the best solution to the real-time datagram header size problem.

The preferred embodiments utilize a new transport protocol that is well-suited for real-time datagram transport over a wide variety of link layer technologies. This protocol is described in B. Thompson et al., "Tunneled multiplexed Compressed RTP ('TCRTP')", Audio/Video Transport Working Group, Internet Draft draft-ietf-avt-tcrtp-00.txt, March 2000, and is incorporated herein by reference. TCRTP uses many of the same principles used by CRTP to compress RTP/UDP/IP headers, but does not place the processing burden at link layer. Instead, TCRTP sits on top of IP, and can utilize existing network services that switch and route IP traffic.

Figure 4:
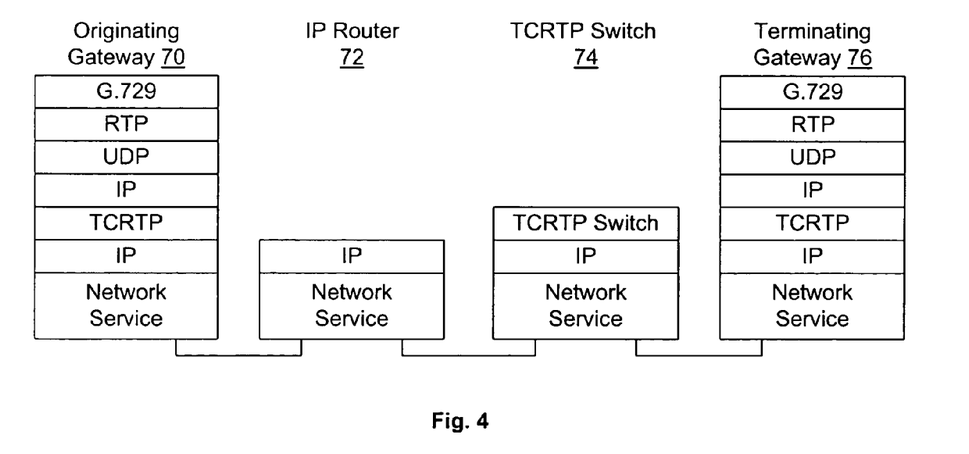
FIG. 4 illustrates protocol stacks for a communication path according to one embodiment of the invention.

FIG. 4 shows exemplary protocol stacks for four types of network elements, an originating gateway 70, an IP router 72, a TCRTP multiplex switch 74, and a terminating gateway 76. Gateways 70 and 76 contain two IP layers—the IP header for an RTP/UDP/IP datagram is compressed by TCRTP, and then tunneled in a second IP datagram, or tunnel packet. The IP tunnel packet in this example can be addressed to TCRTP multiplex switch 74, which runs a TCRTP switch layer. This layer is responsible for de-tunneling a tunneled datagram addressed to it, placing the de-tunneled datagram in a new IP tunnel datagram destined, e.g., for terminating gateway 76, and dispatching the new IP tunnel datagram towards its destination. Terminating gateway 76 de-tunnels the second IP tunnel datagram, decompresses the RTP/UDP/IP tunneled datagram headers, and passes the RTP packet up for further processing. Note that IP router 72 performs only its normal IP tasks for an IP tunnel datagram, and is not burdened with any additional processing by this TCRTP implementation.

Tunneling relieves the link layer of the tasks required by the prior art CRTP method, and allows end-to-end RTP header compression. Of course, instead of a four-octet CRTP header, the TCRTP packet requires a twenty-octet IP tunnel header and a four-octet TCRTP header. Preferably, however, the IP tunnel header is amortized by multiplexing multiple TCRTP payloads onto each IP tunnel packet.

Figure 5:
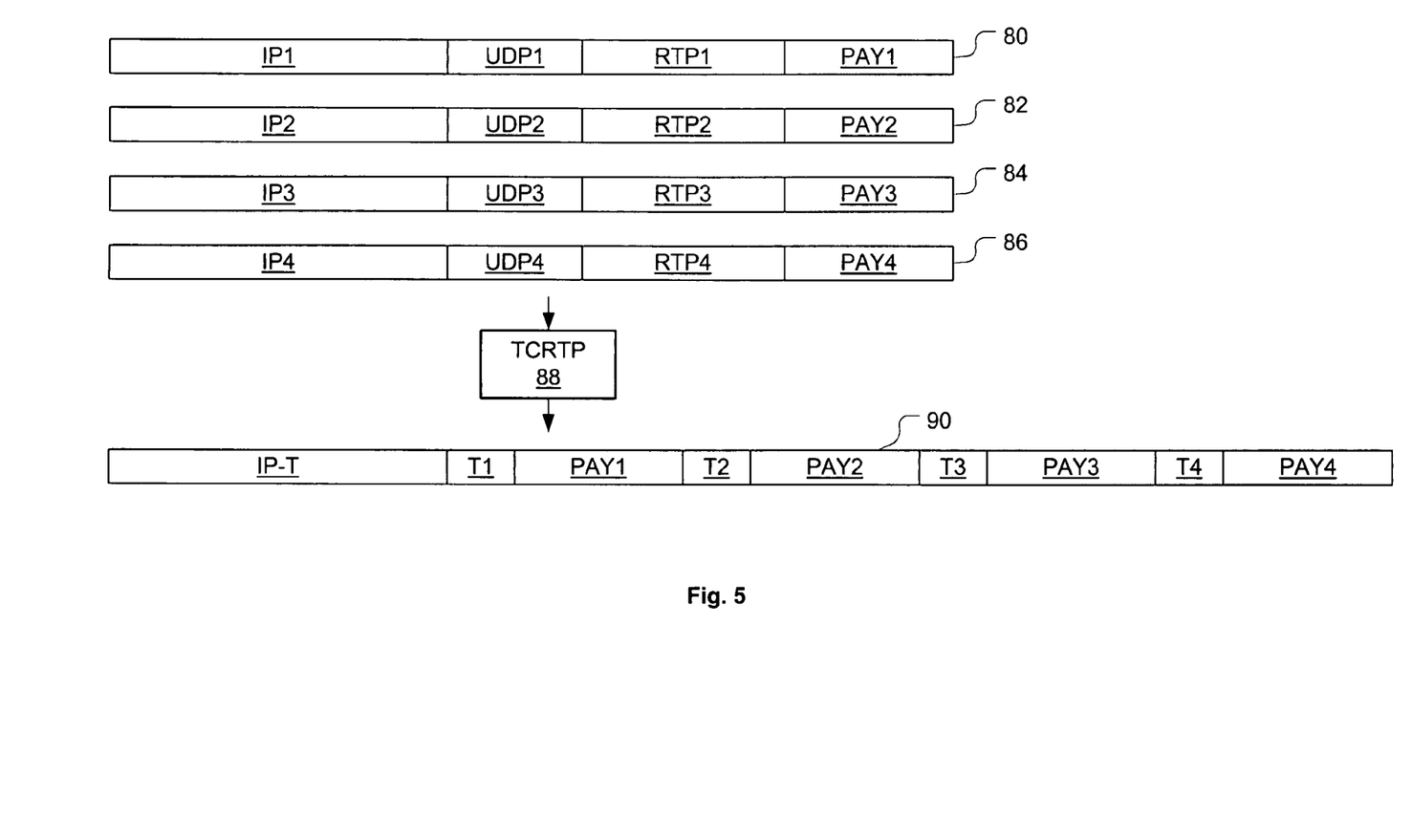
FIG. 5 depicts how multiple datagrams are combined by TCRTP into a tunnel packet.

FIG. 5 illustrates how the cost of the IP tunnel header is amortized. Consider an example where originating gateway 70 generates four RTP streams, each bound for terminating gateway 76. During one 10 msec period, each RTP stream will create one RTP datagram at gateway 70. In FIG. 5, RTP datagrams 80, 82, 84, and 86 represent one datagram from each of the four streams, respectively.

TCRTP block 88 notes that each of datagrams 80, 82, 84, and 86 are bound for a common terminating gateway 76. Block 88 compresses IP1, UDP1, and RTP1 of datagram 80 to a TCRTP header T1, and places T1 and PAY1 in tunnel datagram 90. Block 88 then compresses the headers for datagrams 82, 84, and 86 similarly to form TCRTP headers T2, T3, and T4. T2, PAY2, T3, PAY3, T4, and PAY4 are appended to tunnel datagram 90. An IP header IP-T is prepended to tunnel datagram 90, addressing the datagram to terminating gateway 76. Note that because the IP tunnel header of datagram 90 is shared by four TCRTP payloads, the effective header cost for each payload is only nine octets. As more TCRTP payloads are multiplexed into a common datagram, the header cost per tunneled datagram approaches the cost of the TCRTP header.

Note that, in general, it would not be desirable to have two RTP packets from the same RTP stream packed into the same tunnel datagram (although this is certainly feasible). One problem with such an approach is that the first packet would be unnecessarily delayed while TCRTP waited for the second packet to be formed. A second problem is that were the tunnel datagram to be lost, quality for that RTP stream would suffer doubly. Thirdly, were the tunnel datagram to be lost, there would be an increased chance that TCRTP would lose synchronization for that stream.

In the preceding multiplex example, multiple RTP streams shared the same originating and terminating gateways, thus allowing packets from those streams to be multiplexed using TCRTP. Although this is certainly possible, in a network with many, many gateways, it becomes less likely that a large number of RTP streams originating at one gateway will share the same terminating gateway, and in any event, this coincidence cannot be relied upon. There is typically not enough commonality in calls between a particular pair of originating and destination gateways to support an effective level of multiplexing. Therefore, TCRTP multiplex switch 74 is key to effective multiplexing of RTP streams using TCRTP.

Figure 6:
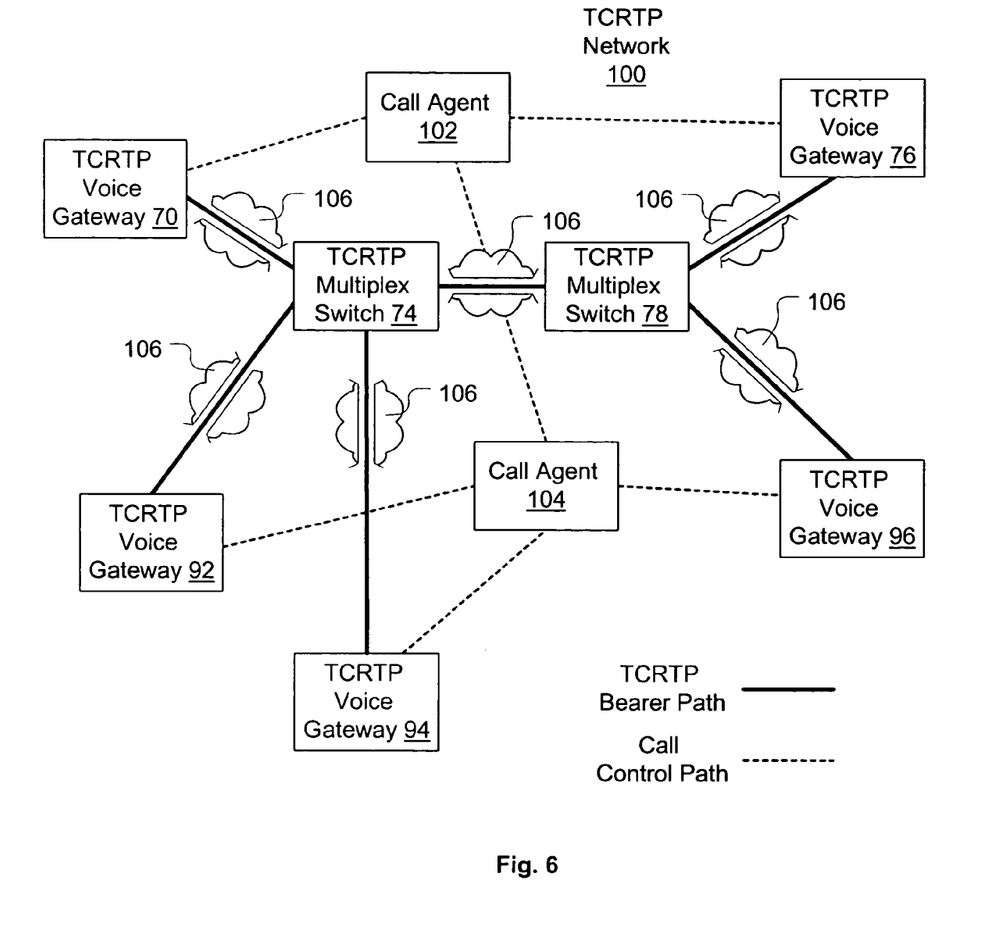
FIG. 6 contains a block diagram for a packet voice network according to an embodiment of the invention.

FIG. 6 shows a relatively small, but exemplary, TCRTP network 100 according to an embodiment of the invention. In addition to gateways 70 and 76 of FIG. 4, network 100 has three additional gateways 92, 94, and 96. And in addition to TCRTP multiplex switch 74, network 100 has a second multiplex switch 78. Each gateway is illustrated connected to one of switches 74 and 78 by a TCRTP tunneled multiplex, through an underlying network service 106. Switches 74 and 78 are also connected by a TCRTP tunneled multiplex. Of course, a particular tunneled multiplex may be implemented with a direct link, and there is no requirement that the same network service be used for each tunnel.

Network 100 can increase utilization of TCRTP multiplexing as compared to gateway-to-gateway direct tunneling. If a particular gateway sends all, or a significant fraction of, its active RTP streams through a TCRTP tunnel to an adjacent multiplex switch, that tunnel should be efficiently utilized. Likewise, because switches 74 and 78 aggregate calls passing from one side of the network to the other, there is a high probability that the TCRTP tunnel between the switches will be highly utilized.

Figure 7:
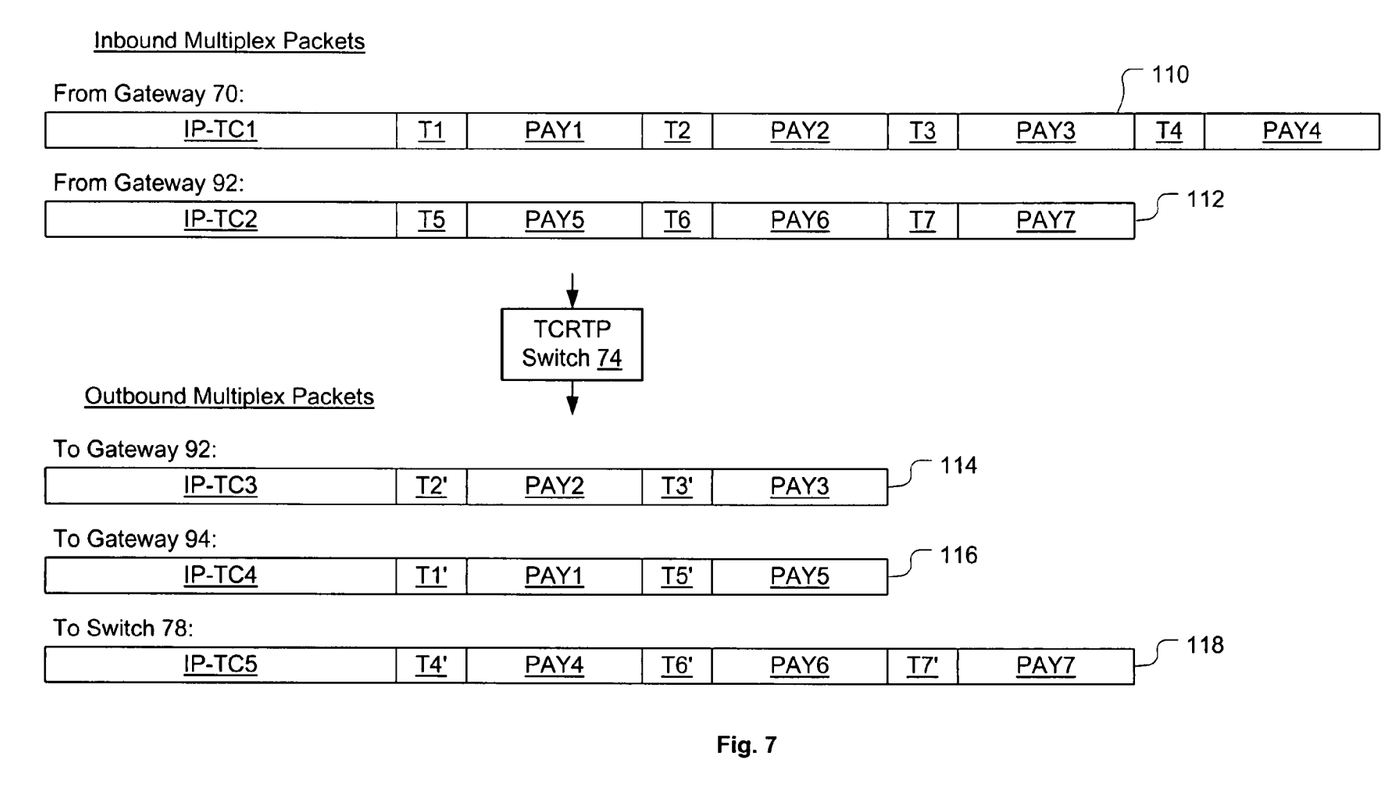
FIG. 7 illustrates inbound-to-outbound multiplexed payload switching according to an embodiment of the invention.

This concept is further illustrated in FIG. 7. Suppose TCRTP switch 74 receives two inbound multiplex packets 110, 112 at approximately the same time. Packet 110's IP header IP-TC1 indicates a source address of gateway 70. Packet 1112's IP header IP-TC2 indicates a source address of gateway 92. Both packets are addressed to switch 74. Switch 74 strips headers IP-TC1 and IP-TC2 from the inbound packets, and examines the TCRTP header (e.g., T1) for each payload. Switch 74 matches each payload to a stored context based on the context's TCRTP header. The stored context allows switch 74 to determine which outbound TCRTP tunnel should be used for that payload.

In this particular example, it is determined that PAY2 and PAY3 are bound for gateway 92, that PAY1 and PAY5 are bound for gateway 94, and that PAY4, PAY6, and PAY7 are bound for gateways not connected to switch 74 by a direct tunnel. These last three payloads are thus sent to switch 78 for further switching.

The outbound payloads sharing a common destination are aggregated into a common outbound multiplex packet. This may entail modification to the TCRTP header accompanying each payload, as will be described at a later point. Once aggregated, the TCRTP payloads and headers are prepended with an IP header indicating their respective tunnel destinations, and placed on the network.

Figure 8:
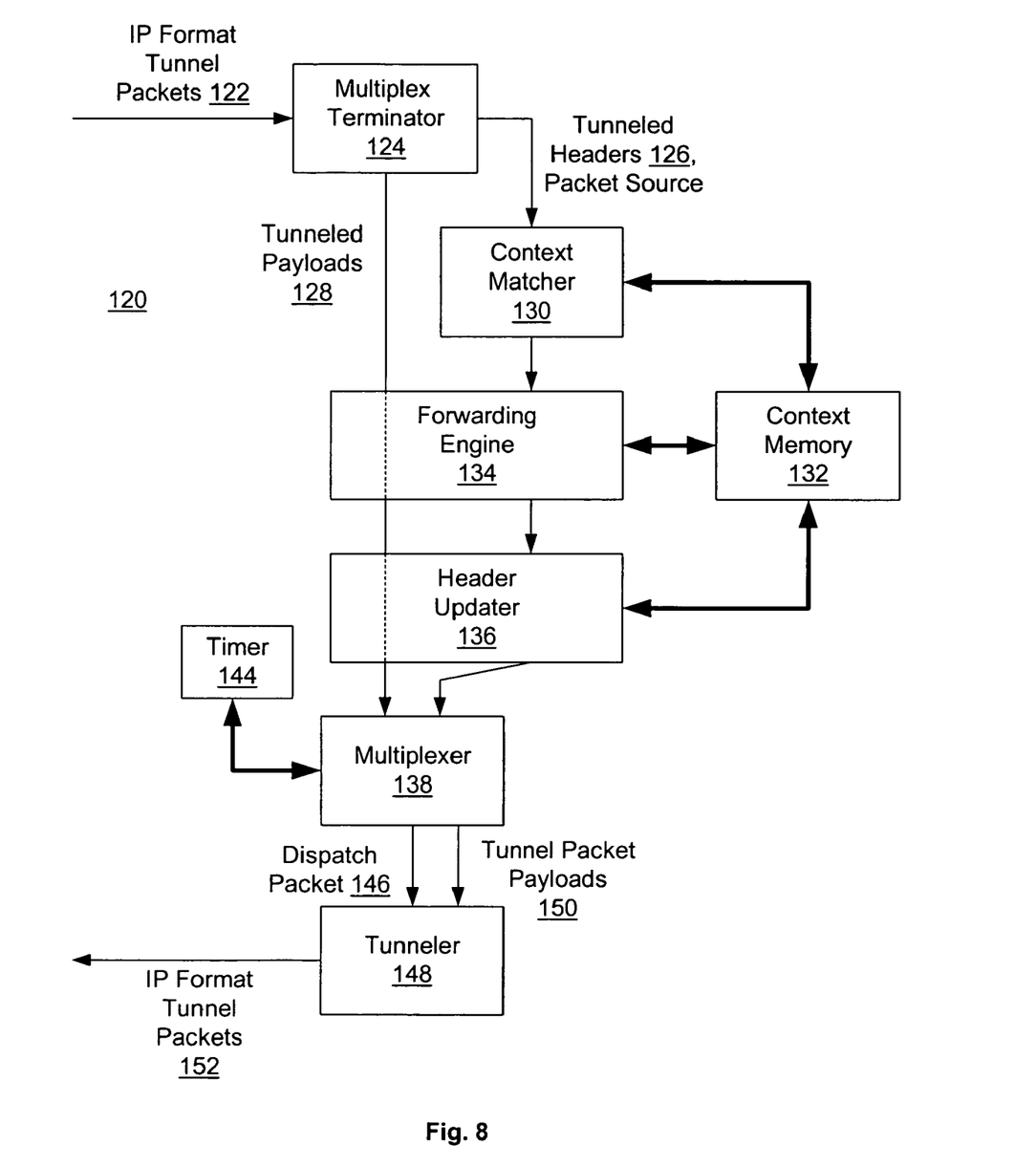
FIGS. 8 and 9 show high-level block diagrams for tunnel switches according to embodiments of the invention.

FIG. 8 contains a block diagram for a TCRTP switch 120 according to an embodiment of the invention. An IP format tunnel packet 122 received by the switch is passed to multiplex terminator 124, which strips the IP header and parses the tunnel packet payload into individual tunneled datagrams. Tunneled headers 126, along with the IP address for the tunnel packet source, are passed to context matcher 130.

Context matcher 130 uses the IP tunnel packet source address and context ID (CID) from each tunneled header to match that tunneled header to an existing switching context. Switching contexts are preferably maintained in context memory 132. Context matcher 130 may, e.g., use the IP source address and tunneled header CID as input to a hashing function, which determines the address of the appropriate switching context in context memory 132. Methods for initializing new contexts, refreshing or updating existing contexts, and dealing with error conditions will be described later in conjunction with the description of FIG. 10.

Once a tunneled header has been associated with a switching context, the header and the association (e.g., an address into context memory 132) are passed to forwarding engine 134. Forwarding engine 134 has responsibility for mapping associated datagrams to outbound multiplexes. This involves a decision as to which outbound tunnel is most appropriate for the destination address indicated in the context. Factors to be considered can be, e.g., TCRTP routes known to the forwarding engine, whether those routes are currently up, and the traffic load on each route. Based on such considerations, the forwarding engine can indicate the outbound tunnel in the context state, and assign an unassigned CID for that tunnel to that context state. Generally, once the mapping has been done and stored in the context state, it will not have to be repeated for a given context unless a problem occurs with the original route.

Header updater 136 is responsible for modifying tunneled headers 126 to conform to their outbound multiplexes. In most situations, this will entail replacing the inbound CID with an outbound CID that will be recognized by the TCRTP next-hop destination of the tunneled datagram. In some situations, such as when a TCRTP route changes, the header may have to be expanded to provide context information to the new TCRTP next-hop destination. Header updater 136 passes the updated tunneled header, the corresponding tunneled payload 128, and an indication of the selected outbound TCRTP multiplex (this can be the IP address of the multiplex destination) to multiplexer 138.

Multiplexer 138 aggregates tunneled datagrams assigned to a common outbound multiplex into a tunnel packet payload. As a typical switch 120 will have multiple outbound TCRTP tunnels, multiplexer 138 will generally be building several payloads simultaneously. As each outbound tunneled datagram 142 is received by multiplexer 138, the datagram will be appended to the appropriate tunnel packet payload being constructed multiplexer 138. When a tunnel packet payload is ready for dispatch, either because timer 144 expires for that payload, or because a full payload size has been reached, a dispatch packet signal 146 is sent to tunneler 148.

Tunneler 148 responds to dispatch packet signal 146 by datagram-encapsulating a tunnel packet payload 150 in an IP-format tunnel packet 152 and dispatching the tunnel packet. The dispatch packet signal 146 may, e.g., indicate destination IP address, payload length, and an address in packet memory where the payload can be obtained. Tunneler 148 may be implemented as an IP layer that is shared by other IP services resident on switch 120.

Figure 9:
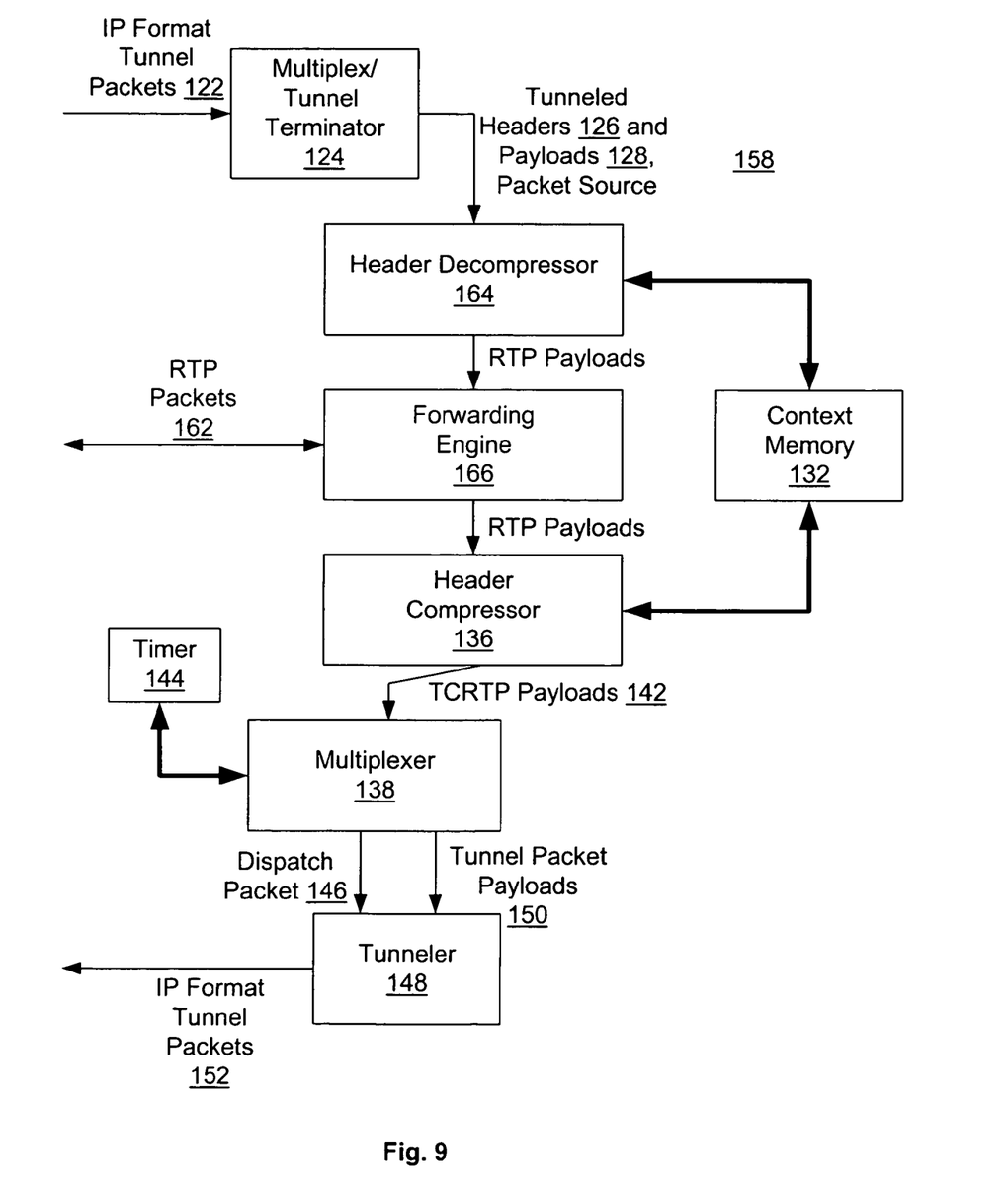

FIG. 9 contains a block diagram for a second TCRTP switch embodiment 158 that relieves the dual constraints that inbound tunneled datagrams must be switched to outbound multiplexes, and that outbound tunneled datagrams must have been received on inbound multiplexes. Although similar to switch 120, switch 158 differs in that it terminates and originates TCRTP streams. Header decompressor 164, instead of stopping after matching a tunneled header to a switching context, performs a full TCRTP decompression on received headers 126, and passes RTP payloads to forwarding engine 166. Forwarding engine 166 makes a forwarding decision for the RTP packet; when the packet is to be shipped out on a TCRTP multiplex, it is sent to header compressor 136.

Header compressor 136 matches the outgoing RTP packet with an outgoing context in context memory 132, and performs TCRTP compression on the headers. TCRTP payloads 142 are passed by compressor 136, along with an indication of the tunnel to be used, to multiplexer 138 for further processing as described above for FIG. 8.

Operating according to FIG. 9, a TCRTP switch may fully decompress (and recompress) every received TCRTP header, thus maintaining full RTP/UDP/IP states in context memory 132. Strictly speaking, this is unnecessary for switching operation, as only the TCRTP endpoints for a compressed RTP stream need save full state. The switch can save an incoming tunnel/CID, an outgoing tunnel/CID, and source and destination IP addresses for each switching context—all other variables may merely be copied from incoming TCRTP headers to outgoing TCRTP headers. An advantage of maintaining full state is the ability to redirect a stream to a new TCRTP path at any time by creating and sending full headers for the context. Similarly, if a downstream device loses synchronization, the switch can restore synchronization without having to pass a request back to the originating gateway. Disadvantages to saving state are mainly computational, as the switch must expend time and resources in updating state.

Note that with full TCRTP compression and decompression performed at the multiplex switch, RTP packets 162 may be switched in or out of the tunnel network by forwarding engine 166 as it deems appropriate.

Figure 10:
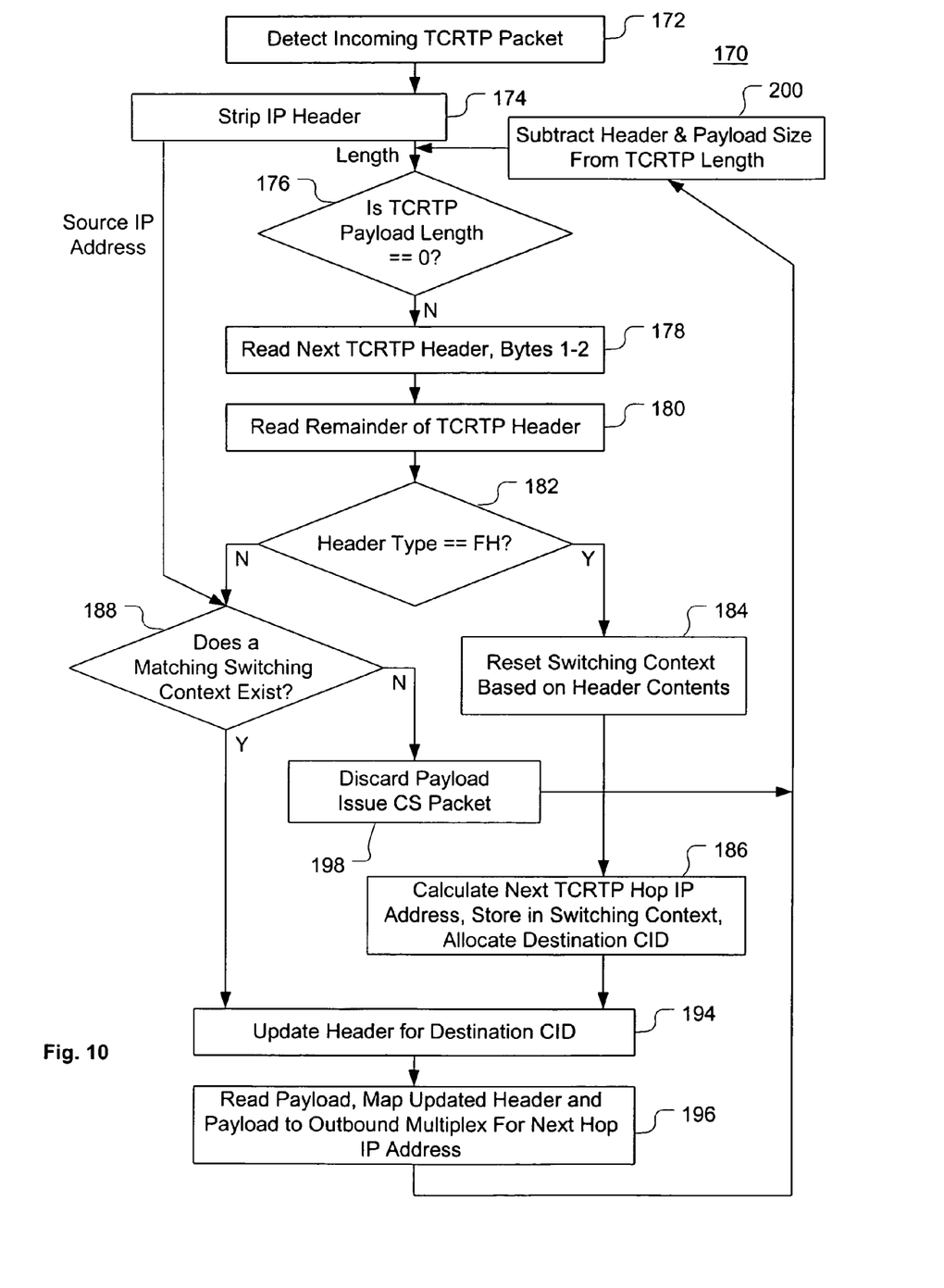
FIG. 10 contains a high-level flow chart for inbound tunnel packet processing according to one embodiment of the invention.

FIG. 10 contains a high-level flowchart 170 that illustrates a method for operating a TCRTP switch according to the invention. At block 172, an incoming TCRTP packet is detected, e.g., because the IP packet header indicates that the packet is of type TCRTP. At block 174, this header is stripped—the source IP address is passed to block 188, and the IP packet length is passed to block 176. Decision block 176 examines the remaining packet payload length, and if this is nonzero, processing continues at block 178. Block 178 reads the next two unread octets in the payload, which should be the first two octets of a TCRTP header. These octets indicate the type of TCRTP header that follows, the CID field (the CID field may be selected on a given tunnel to allow either 256 unique CID values (one-octet field) or 65,536 unique CID values (two-octet field) for a given tunnel), and the length of the payload for the first tunneled datagram. Based on this information, block 180 reads the remainder of the TCRTP header for this tunneled datagram.

Decision block 182 switches on whether the header type equals FH (Full Header). If the header type is FH, the header contains full RTP/UDP/IP headers, and the contents of the switching context may be reset accordingly at block 184. This relieves the switch of having to determine when an incoming CID is no longer in use—incoming old CIDs can merely sit unused until re-used by their tunnel. Since the re-use must start with a full header, the full header reinitializes the context to its current stream. Whenever the context has been reset, block 186 calculates the next TCRTP hop and stores this in the switching context. A destination CID is also allocated at this point. Control is then passed to block 194.

If the header type is not FH, the context represented in the header should already exist when the packet arrives. The source IP address and context ID are used at block 188 to match the header to an existing context. If this cannot be done, block 198 discards the corresponding payload and issues a CS (Context State) packet back to the source IP, indicating that context state is needed for that CID. Control is then passed to block 200 for processing of any additional tunneled datagrams from the original packet. If the context match is successful, the match is communicated to block 194.

Block 194 updates the header for the outgoing tunneled datagram. Typically, this will require substitution of the outgoing CID (one that will be recognized by the next-hop TCRTP destination) in place of the incoming CID in the header contents.

Block 196 readies the tunneled datagram for the outbound multiplexer. This involves indicating to the multiplexer which outbound multiplex the tunneled datagram maps to, supplying the updated header to the multiplexer, and reading the datagram payload from the original packet and passing this on to the multiplexer. Once the tunneled datagram has been sent to the multiplexer, control is passed back to block 200 for processing of other tunneled datagrams that remain to be parsed from the original tunnel packet.

Block 200 adjusts the size of the tunnel packet payload by subtracting the size of the header and datagram payload just read. The adjusted tunnel packet payload size is then supplied to block 176 for an evaluation as to whether additional tunneled datagrams remain in the tunnel packet.

Figure 11:
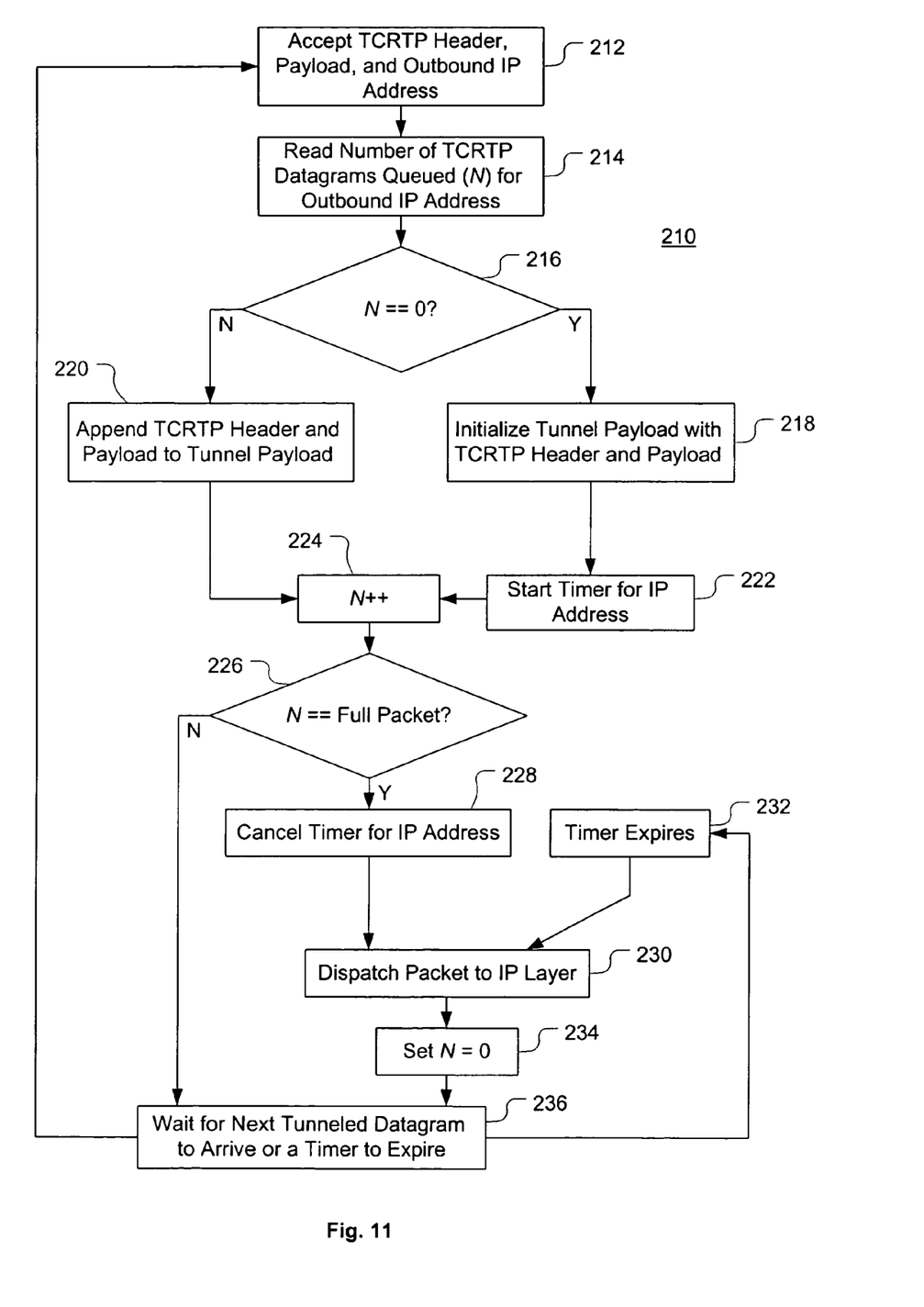
FIG. 11 contains a high-level flow chart for outbound tunnel packet building according to one embodiment of the invention.

FIG. 11 contains a high-level flowchart 170 that illustrates a method for multiplexing TCRTP datagrams into tunnel packets and providing for orderly dispatch of those packets. When the multiplexer is notified that a new TCRTP datagram is ready for multiplexing, block 212 accepts the TCRTP header, payload, and IP address of the next-hop TCRTP switch or gateway for that datagram. Block 214 then determines the number of TCRTP datagrams N presently queued for transmission to that same next-hop switch or gateway.

Processing branches at decision block 216, depending on whether N is zero. When N is nonzero, a tunnel packet is already under construction for the next-hop switch or gateway. In this case, block 220 appends the TCRTP datagram header and payload to the under-construction tunnel packet. When N is zero, however, a new tunnel packet payload needs to be initialized, with the TCRTP datagram header and payload appearing as the first tunneled datagram in the payload. Block 218 performs this function.

Blocks 218 and 220 both transfer control to block 224, which increments N. Block 218 also activates a timer at block 222. This timer corresponds to the arrival time of the new tunnel packet that has just been initialized, and exists to ensure that the packet buildout time does not exceed a selected maximum time limit. This prevents the first TCRTP datagram placed in a tunnel payload from experiencing large delays merely because not enough other datagrams are arriving to build out the payload.

After N has been incremented, decision block 226 checks whether N meets a transmission target for a full packet. For example, on a given tunnel, the target may be to transmit once 7 datagrams have been aggregated into a tunnel payload. On a different tunnel, the target may be less or more, and the target may be adapted to conform to observed datagram rates for each tunnel.

When the target has not been reached, control is transferred to block 236, where the multiplexer enters a wait state until either a new TCRTP datagram arrives or a timer expires. When the target has been reached, block 228 cancels the timer associated with that tunnel payload. Block 230 then dispatches the tunnel payload to the IP layer, and block 234 sets N=0 for that tunnel.

Note that block 230 is also reached when the timer started for a tunnel payload at block 222 expires (block 232). In this case, the dispatched packet is shorter than desired, but packet buildout is terminated to minimize delay.

In the preferred embodiments, multiplex switches are not controlled on a per-call basis. Thus call control is preferably outside the scope of the invention. The originating and terminating gateways 70, 76, 92, 94, and 96 (FIG. 6) perform call admission control, and notify call agents 102 or 104 as to whether admission succeeds or fails. Although a variety of protocols exist for performing call admission, one call admission method for use with the preferred network embodiments uses Resource reSerVation Protocol (RSVP), as described in R. Braden et al., "Resource ReSerVation Protocol (RSVP)-Version 1 Functional Specification", Network Working Group, RFC 2205, September 1997. RSVP allows reservation of bandwidth. The preferred method works in conjunction with—instead of a per-call reservation—a gateway-to-gateway reservation that represents an aggregate of all bandwidth needed for calls passing between them. The gateways are responsible for maintaining and dynamically resizing their reservation based on the active calls, including estimating any multiplexing gain achieved by TCRTP multiplexing. A conservative approach for accomplishing this is to increase reservation size, when a new call is added, by a worst-case bandwidth—the reservation size may later be resized downwards based on an observed effective multiplexing gain.

The disclosed embodiments presented herein are exemplary. In particular, RTP and IP have been used in the examples because of their prevalence and wide acceptance; this does not prevent the invention from being used with other transport and datagram protocols. TCRTP has been presented as one method of communicating tunneled datagram headers, but many variations on the underlying method fall within the scope of the invention. A TCRTP switch itself may switch only TCRTP traffic, or may run on a platform, such as an IP router, that performs many additional functions. The TCRTP switch may use a single processor, or it may distribute its processing load among several processors—this distribution could be made, e.g., on a per-tunnel basis, or on an ingress/forwarding/egress basis. Some functions could be implemented in hardware or firmware, and all of the functions described can be implemented using a processor that executes instructions stored on a computer-readable medium. The methods disclosed for performing the switching functions of the invention are exemplary, as those of ordinary skill in the art will recognize that many viable design alternatives exist for these functions. Various other modifications to the disclosed embodiments will be obvious to those of ordinary skill in the art upon reading this disclosure, and are intended to fall within the scope of the invention as claimed.

What is claimed is:

1. A method of carrying packetized voice data over a data network, the method comprising:

aggregating multiple datagrams bound for a common intermediate switching point into a tunnel packet payload, each datagram comprising a voice data payload from a selected voice data stream and a compressed header-formatted header from which—when combined with information from one or more previous datagram headers from the same voice data stream—the datagram's destination endpoint can be derived;

encapsulating the tunnel packet payload in a tunnel packet having a tunnel header and forwarding the tunnel packet to the intermediate switching point; and deaggregating the tunnel packet payload at the intermediate switching point and assigning the datagrams to new tunnel packet payloads based on a destination endpoint derived from each datagram's header and one or more previous datagram headers from the same voice data stream;

wherein the tunnel header is configured so that a packet-switched network device routing or forwarding packets according to a network address does not reference the tunnel packet payload.

2. The method of claim 1, further comprising, at the intermediate switching point, encapsulating each of the new tunnel packet payloads in a corresponding tunnel packet addressed either to the destination endpoint indicated for that tunnel packet's payload datagrams, or to a second intermediate switching point.

3. The method of claim 2, wherein each tunnel packet is encapsulated in an Internet Protocol datagram for network transport.

4. The method of claim 2, wherein assigning the datagrams to new tunnel packet payloads comprises:
   matching each datagram's header information to a switching context maintained by the intermediate switching point, the switching context updated based on datagram header information for datagrams matched to that switching context; and
   placing the datagram in a new tunnel packet payload selected based on the destination endpoint indicated in the matched switching context.

5. The method of claim 1, wherein each tunnel packet is encapsulated in one or more Asynchronous Transfer Mode cells for network transport.

6. The method of claim 1, wherein encapsulating further includes encapsulating using the Layer 2 Tunneling Protocol (L2TP).

7. The method of claim 1, wherein the compressed header-formatted headers are formatted by compressing an Internet Protocol (IP) header, a User Datagram Protocol (UDP) header, and a Real-time Transport Protocol (RTP) header.

8. The method of claim 1, wherein the compressed header-formatted headers are formatted by compressing a voice data header.

9. A method of carrying packetized voice data over a data network, the method comprising:
   aggregating multiple datagrams bound for a common intermediate switching point into a tunnel packet payload, each datagram comprising a voice data payload from a selected voice data stream and a compressed header-formatted header from which—when combined with information from one or more previous datagram headers from the same voice data stream—the datagram's destination endpoint can be derived;
   encapsulating the tunnel packet payload in a tunnel packet and forwarding the tunnel packet to the intermediate switching point;
   deaggregating the tunnel packet payload at the intermediate switching point and assigning the datagram's to new tunnel packet payloads based on a destination endpoint derived from each datagram's header and one or more previous datagram headers from the same voice data stream; and
   occasionally resetting the switching context by sending a datagram for that switching context with an uncompressed header.

10. A method of carrying packetized voice data over a data network, the method comprising:
    aggregating multiple datagrams bound for a common intermediate switching point into a tunnel packet payload, each datagram comprising a voice data payload from a selected voice data stream and a compressed header-formatted header from which—when combined with information from one or more previous datagram headers from the same voice data stream—the datagram's destination endpoint can be derived;
    encapsulating the tunnel packet payload in a tunnel packet and forwarding the tunnel packet to the intermediate switching point;
    deaggregating the tunnel packet payload at the intermediate switching point and assigning the datagrams to new tunnel packet payloads based on a destination endpoint derived from each datagram's header and one or more previous datagram headers from the same voice data stream; and
    resetting the switching context to a new voice data stream by sending a datagram for that switching context with an uncompressed header.

11. A method of switching voice data within a data network, the method comprising:
    receiving inbound tunnel packets, each inbound tunnel packet having the capability to carry a payload comprising multiple tunneled datagrams, each tunneled datagram having a corresponding header with a compressed header format that identifies it as belonging to a specified switching context;
    parsing the payload from an inbound tunnel packet into individual incoming tunneled datagrams;
    associating individual incoming tunneled datagrams with corresponding switching contexts;
    mapping associated tunneled datagrams to outbound multiplexes based on the destination endpoint indicated in each datagram's associated context state;
    updating the header for a tunneled datagram mapped to an outbound multiplex to identify that datagram with a switching context known to the outbound multiplex's destination;
    aggregating tunneled datagrams assigned to a common outbound multiplex into an outbound tunnel packet payload; and
    encapsulating the outbound tunnel packet payload using the Layer 2 Tunneling Protocol (L2TP):
    wherein the corresponding headers are formatted by compressing voice data headers.

12. The method of claim 11, further comprising, after associating, decompressing the header of a tunneled datagram, and, prior to aggregating, compressing the header of the tunneled datagram.

13. A tunnel packet payload switch, wherein each tunnel packet has the capability to carry a payload comprising multiple tunneled datagrams, each tunneled datagram having a corresponding header with a compressed header format that identifies it as belonging to a specified switching context, the switch comprising:
    a multiplex terminator to receive an inbound tunnel packet payload and parse the payload into individual incoming tunneled datagrams;
    a context memory to store context state for multiple switching contexts;
    a context matcher to associate individual incoming tunneled datagrams with corresponding switching contexts stored in the context memory;
    a forwarding engine to map the associated tunneled datagrams to outbound multiplexes based on the destination endpoint indicated in each datagram's associated context state;
    a header updater to revise the header for a tunneled datagram mapped to an outbound multiplex to identify that datagram with a switching context known to the outbound multiplex's destination;
    a multiplexer to aggregate tunneled datagrams assigned to a common outbound multiplex into an outbound tunnel packet payload; and
    a tunneler to datagram-encapsulate the outbound tunnel packet payload into a tunnel datagram using a layer two tunneling protocol;

wherein the revised header is configured so that a device routing or forwarding packets according at layer three can not examine contents of the outbound tunnel packet payload.

14. The switch of claim 13, wherein the inbound tunnel packet payload arrives at the switch encapsulated in a tunnel packet having a tunnel packet header that identifies the tunnel packet with an inbound multiplex, the multiplex terminator stripping the tunnel packet header and providing an indication of the tunnel packet's inbound multiplex to the context matcher.

15. The switch of claim 13, further comprising a decompressor to decompress compressed tunneled datagram headers, wherein the context matcher uses the decompressor output to update a full uncompressed header state in the context memory.

16. The switch of claim 13, further comprising a timer in communication with the multiplexer, the multiplexer using the timer to dispatch an outbound tunnel packet payload when the first tunneled datagram to be assigned to a payload has been delayed by a maximum desired delay.

17. The switch of claim 16, the multiplexer also dispatching an outbound tunnel packet payload when the maximum desired delay has not been reached, but a desired payload size has been reached.

18. The switch of claim 13, the context matcher having the capability to construct a switching context for an incoming non-tunneled datagram and associate the incoming non-tunneled datagram with that switching context, the forwarding engine having the capability to map the associated non-tunneled datagram to an outbound multiplex.

19. The switch of claim 13, the forwarding engine having the capability to map an associated inbound tunneled datagram into an outbound non-tunneled datagram.

20. A tunnel packet payload switch, wherein each tunnel packet has the capability to carry a payload comprising multiple tunneled datagrams, each tunneled datagram having a corresponding header with a compressed header format that identifies it as belonging to a specified switching context, the switch comprising:
- a multiplex terminator to receive an inbound tunnel packet payload and parse the payload into individual incoming tunneled datagrams;
- a context memory to store context state for multiple switching contexts;
- a context matcher to associate individual incoming tunneled datagrams with corresponding switching contexts stored in the context memory;
- a forwarding engine to map the associated tunneled datagrams to outbound multiplexes based on the destination endpoint indicated in each datagram's associated context state;
- a header updater to revise the header for a tunneled datagram mapped to an outbound multiplex to identify that datagram with a switching context known to the outbound multiplex's destination; and
- a multiplexer to aggregate tunneled datagrams assigned to a common outbound multiplex into an outbound tunnel packet payload;
- wherein the forwarding engine has the capability to reroute tunneled datagrams associated with a given switching context by changing a field in the switching context from one outbound multiplex identifier to another;
- wherein the revised header is configured so that a router operating in a packet-switched network does not access the outbound tunnel packet payload.

21. A tunnel packet payload switch, wherein each tunnel packet has the capability to carry a payload comprising multiple tunneled datagrams, each tunneled datagram having a corresponding header with a compressed header format that identifies it as belonging to a specified switching context, the switch comprising:
- means for receiving inbound tunnel packet payloads and parsing the payloads into individual incoming tunneled datagrams;
- means for associating individual incoming tunneled datagrams with corresponding switching contexts;
- means for mapping associated tunneled datagrams to outbound multiplexes based on the destination endpoint indicated in each datagram's associated context state;
- means for revising the header for a tunneled datagram mapped to an outbound multiplex to identify that datagram with a switching context known to the outbound multiplex's destination; and
- means for aggregating tunneled datagrams assigned to a common outbound multiplex into an outbound tunnel packet payload; and
- means for generating a tunnel header for encapsulating the outbound tunnel packet payload;
- wherein the tunnel header is adapted to cause the outbound tunnel packet payload to tunnel under a layer three network layer.

22. An article of manufacture comprising a computer-readable medium containing a tunneled datagram processor program, the tunneled datagram processor program when executed causing a processor or several communicating processors to execute:
- a context memory manager to update and manage a context memory that retains context state for multiple switching contexts, the context state for a given switching context including the destination endpoint for datagrams belonging to that context;
- a context matcher to associate individual incoming tunneled datagrams with corresponding switching contexts stored in the context memory, wherein a tunneled datagram comprises a compressed-format header facilitating matching to a switching context;
- a forwarder to map the associated tunneled datagrams to outbound multiplexes based on the destination endpoint indicated in each datagram's associated context state;
- a header updater to revise the header for a tunneled datagram assigned to an outbound multiplex to identify that datagram with a switching context known to the outbound multiplex's destination; and
- a multiplexer to aggregate tunneled datagrams assigned to a common outbound multiplex into an outbound tunnel packet payload;
- wherein the compressed-formatted header is formed by compressing voice data headers and may be decompressed to form decompressed headers;
- wherein the revised header causes the outbound tunnel packet payload to tunnel through a router that performs network layer routing.

23. The article of manufacture of claim 22, wherein the tunneled datagram processor program when executed also causes the processor Or several communicating processors to execute:
- a multiplex terminator to receive an inbound tunnel packet payload and parse the payload into the individual incoming tunneled datagrams.

24. The article of manufacture of claim 22, wherein a tunneled datagram further comprises a payload of compressed voice data.

* * * * *

UNITED STATES PATENT AND TRADEMARK OFFICE
CERTIFICATE OF CORRECTION

| | | |
|---|---|---|
| PATENT NO. | : 7,136,377 B1 | Page 1 of 1 |
| APPLICATION NO. | : 09/539408 | |
| DATED | : November 14, 2006 | |
| INVENTOR(S) | : Tweedly et al. | |

It is certified that error appears in the above-identified patent and that said Letters Patent is hereby corrected as shown below:

At column 13, line 43, please replace "the datagram's" with --the datagrams--.
At column 16, line 58, please replace "the processor Or" with --the processor or--.

Signed and Sealed this

Thirty-first Day of March, 2009

JOHN DOLL
*Acting Director of the United States Patent and Trademark Office*